COLOR TELEVISION SYSTEM

Filed Feb. 28, 1952 7 Sheets-Sheet 1

INVENTOR.
JOHN B. CHATTEN
BY Oswald V. Hazeltine
ATTORNEY

Jan. 3, 1956 J. B. CHATTEN 2,729,697

COLOR TELEVISION SYSTEM

Filed Feb. 28, 1952 7 Sheets-Sheet 2

INVENTOR.
JOHN B. CHATTEN
BY
Allen V. Hazeltine
ATTORNEY

INVENTOR.
JOHN B. CHATTEN
BY
Deem V. Hazeltine
ATTORNEY

INVENTOR.
JOHN B. CHATTEN
BY
[signature]
ATTORNEY

INVENTOR.
JOHN B. CHATTEN
BY
Allen V. Hazeltine
ATTORNEY

Jan. 3, 1956 J. B. CHATTEN 2,729,697

COLOR TELEVISION SYSTEM

Filed Feb. 28, 1952 7 Sheets-Sheet 6

INVENTOR.
JOHN B. CHATTEN
BY
Allen V. Hazeltine
ATTORNEY

Jan. 3, 1956 J. B. CHATTEN 2,729,697

COLOR TELEVISION SYSTEM

Filed Feb. 28, 1952 7 Sheets-Sheet 7

INVENTOR.
JOHN B. CHATTEN
BY
Allen V. Hazeltine
ATTORNEY 2,729,697

COLOR TELEVISION SYSTEM

John B. Chatten, Philadelphia, Pa., assignor to Philco Corporation, Philadelphia, Pa., a corporation of Pennsylvania Application February 28, 1952, Serial No. 273,929

26 Claims. (Cl. 178—5.2)

The present invention relates to systems for the transmission of chromaticity-specifying intelligence, and more specifically it relates to color television systems in which colors are represented by a composite signal comprising one component which varies in proportion to the Y, or brightness, values of colors, and another component which conveys the cromaticity information.

In certain systems for effecting remote reproduction of a color image, light from the image is analyzed at a transmitter to derive electrical signals representative of specifications of the image with respect to three standard imaginary primaries. These imaginary primaries are those designated X, Y and Z in accordance with the symbolization and definitions established by the International Commission on Illumination. The signals representative of the X, Y and Z values of the color image are then transmitted by appropriate means to a receiver, wherein they are utilized to control suitable sources of real primary colors in such manner as to provide the desired image reproduction.

A system of this general class is described in the copending application No. 225,567 of Frank J. Bingley, entitled "Electrical System" and filed May 10, 1951. In this latter system, the Y-representing signal is limited to a predetermined low-frequency band, and transmitted in a manner substantially identical with that employed in conventional monochrome television systems. The Y signal is also subtracted from both the X- and Z-representing signals, to form X—Y and Z—Y signals. The X—Y and Z—Y signals may then be transmitted as amplitude modulations of a pair of subcarrier signals of different phases, but of a common frequency situated above the Y-signal band. By using X—Y and Z—Y signals, rather than X and Z signals, and by employing balanced modulator arrangements to amplitude-modulate the subcarriers, the subcarrier signals may be caused to become substantially zero when representing achromatic subject matter, since at such times the X, Z and Y values are all equal. The two differently-phased, amplitude-modulated subcarriers, preferably in phase quadrature, are then combined to form a resultant phase- and amplitude-modulated subcarrier signal which is transmitted along with the Y signal to form the complete color-representing transmission.

At the receiver, the resultant subcarrier signal representative of image chromaticity is preferably demodulated by means of synchronous detecting devices, so as to rederive the original X—Y and Z—Y signal components in separate form. The Y, X—Y and Z—Y signals may then be passed through appropriate matrixing networks for converting them to the form necessary to control the real primary color light sources, which are usually the phosphors of cathode-ray tube devices.

An improvement upon color television systems of this type is described in the copending application No. 255,776 of R. C. Moore and John B. Chatten, entitled "Electrical System" and filed November 10, 1951. In this latter application, there is described apparatus for improving the noise performance and compatibility of systems of the above general class, by controlling the relative proportions of the transmitted X—Y and Z—Y signals in accordance with the subjective sensitivity of the average human eye for variations in the X and Z values of colors. Thus, it has been found that the average human eye has a maximum sensitivity to variations in only the X values of colors of any given brightness which is substantially three times its maximum sensitivity to variations in only the Z values of colors of that same brightness. This characteristic of the eye may be represented by eye-sensitivity ellipses drawn on a graph having ordinates and abscissae of Z and X respectively, the contour of each ellipse representing, by its distances from a reference chromaticity point within it, the various amounts of objective chromaticity variation from that point which produce the same subjective chromaticity change, as evaluated by the average human eye. The major axes of these ellipses generally lie at least approximately parallel to the Z axis of such a graph, and the minor axes are at least approximately parallel to the X axis of this graph, representing the fact that the human eye has generally less subjective sensitivity for chromaticity changes due to variations in the Z values of colors than for those due to variations in the X values of colors.

Accordingly, the above-cited application of Moore and Chatten indicates that if X—Y and Z—Y signals are received in equal proportions, and are therefore provided equal gains at the receiver, electrical noise accompanying these signals will be substantially equal, but will produce greater apparent deviations in the X values of reproduced colors than in their Z values. In order to produce subjective chromaticity variations which are substantially equal for all directions of chromaticity change, the area of confusion in actual chromaticity coordinates produced in the reproduced image in response to interfering noise signals, should be elliptical in form and elongated in the Z direction, so as to correspond to the above-mentioned eye-sensitivity ellipses. This can be accomplished, at least to a considerable degree, by providing greater gain for the Z—Y signals than for the X—Y signals at the receiver. When this is done, the Z—Y signals at the transmitter must be provided with a correspondingly reduced amplitude, relative to the X—Y signals, so that proper image reproduction will be effected. Accordingly, the Z—Y signal at the transmitter is generated in such manner that the proportionality constant $K_z$, relating variations in the transmitted signal to variations in the Z values of the televised image, is a fraction of the proportionality constant $K_x$ relating variations in the X values of the televised image to the variations produced thereby in the transmitted signal, this fraction preferably being substantially equal to one-third. By this arrangement, the electrical noise accompanying the Z—Y signals at the image-reproducing portion of the receiver, is caused to exceed that accompanying the X—Y signals, so as to compensate for the relative insensitivity of the eye to variations in the Z values of colors, and to produce improved equalization of the apparent chromaticity changes in various directions.

At the same time, reducing the relative quantity of the Z—Y signal transmitted is in a direction to improve the compatibility of the system, by equalizing more nearly the magnitude of the resultant subcarrier signal which is transmitted for various chromaticities. For, when X—Y and Z—Y signals are transmitted equally, colorimetric considerations indicate that the maximum amplitudes of the Z—Y signals necessary to reproduce a typical gamut of colors are approximately three times greater than the maximum amplitudes of X—Y signals required.

Accordingly, the invention of the above-cited application of Moore and Chatten obtains improvements when both compatibility and noise performance are considered, by virtue of an adjustment which is in the direction to more nearly equalize the amplitude of subcarrier signal required to represent various chromaticities, and which is at the same time in the direction to more nearly equalize those subjectively-evaluated variations in chromaticity in the reproduced image which are produced in response to interfering noise.

Although a very substantial improvement in the noise performance and compatibility of color television systems of the above general class may be obtained by means of the invention described in the above-cited application of Moore and Chatten, I have found that still further improvement may be accomplished in accordance with my invention, by means of apparatus which is capable of producing even better equalization of the subjective effects of electrical noise in producing variations in the chromaticities of reproduced colors, as well as even better equalization of the maximum values of resultant subcarrier signals which are necessary in order to reproduce a typical gamut of colors. By these means, the compatibility and noise performance of the system may be substantially improved, while providing a system which is more conveniently designed and adjusted.

Accordingly, it is an object of my invention to provide a system for the transmission of information as to the specification of colors, in which system either the compatibility of the system with regard to reception by standard monochrome television receivers, or the noise performance of the system, may be substantially improved when compared with systems of the prior art.

Another object is to provide a color television system in which both the compatibility and noise performance of the system may be improved simultaneously.

Still another object is to provide a color television transmitter for transmitting signals which may be received by a standard monochrome television receiver to produce therein a highly satisfactory version of the color image in monochrome, and which may be received by a color receiver to produce a satisfactory color reproduction of the original image, wherein the objectionable subjective effects of electrical noise are substantially reduced.

A further object is to provide a color television receiver for receiving the transmissions of the above-mentioned transmitter and for deriving therefrom an improved color reproduction of the original image.

In accordance with my invention, the above objectives are achieved by representing the chromaticity of the color image in terms of a new pair of primaries, hereinafter designated P and Q, in place of the standard primaries X and Z of the systems of the above-cited copending applications, for example. The new primary P is chosen so as to be nearer in quality than is the standard primary X, to that mixture of X and Z primaries with respect to variations in which the average human eye has substantially its greatest subjective sensitivity, and is preferably identical with this mixture. The P value of a color then equals the sum of A times the standard X value of the color and B times the standard Z value of that color, where the ratio of $-$B to A is greater than zero, is less than substantially one-half, and is preferably substantially equal to 0.23. Similarly, the Q primary is chosen so as to be nearer than is the standard Z primary to that chromaticity, with respect to variations in which the average human eye has substantially its least subjective sensitivity. More specifically, the Q value of a color is equal to the sum of C times the standard X value thereof, and D times the standard Z value thereof, where the ratio of C to D is substantially equal to the above-mentioned ratio of $-$B to A. In the preferred arrangement, this ratio $$\frac{C}{D}$$

will therefore also be substantially equal to 0.23.

Since the average human eye has more nearly its maximum and minimum sensitivities for variations in the P and Q values of colors respectively, electrical noise accompanying the P-representing and Q-representing signals at the receiver, produces chromaticity variations along the minor and major axes, respectively, of the above-mentioned eye-sensitivity ellipses. It therefore becomes possible to control the major and minor axes of the generally elliptical areas of subjective confusion in chromaticity, caused by noise signals, in any desired manner while maintaining the same orientation of ellipse axes, so as to match these elliptical areas of confusion to the eye-sensitivity ellipses in any desired manner. This is in contrast to arrangements utilizing X and Z primaries, wherein noise variations produce chromaticity changes in directions substantially different from the directions of the major and minor axes of the eye sensitivity ellipses, and where it is therefore not generally possible to obtain perfect matching between the areas of subjective confusion in chromaticity produced by noise in the receiver and the eye-sensitivity ellipses, for any color.

A further advantage of the preferred embodiment of the invention, in which the ratio of $-$B to A is substantially 0.23, lies in the fact that the amplitude of subcarrier signal required to represent colors of a scene illuminated by a standard illuminant such as illuminant "C," has substantially its maximum and minimum values when representing only Q and only P values, respectively. Thus, reducing the amount of the Q-representing signal transmitted, relative to the amount of the P-representing signal transmitted, produces improved equalization of the subcarrier demand for various chromaticities, as compared with a system utilizing X and Z primaries. This makes possible further improvements in noise performance and compatibility, as will become more apparent hereinafter.

While the qualities of the primaries P and Q may be defined at least in part by the ratios between the above-mentioned constants A, B, C and D, the quantities of these primaries, and the definitions of the units thereof, are preferably obtained by choosing the units of P and Q in such manner that, when representing achromatic subject matter, the P, Q and Y values are equal, thus permitting the subcarrier signal to be eliminated when representing such subject matter. When representing white, X and Z are also equal to Y. Accordingly, expressing the P and Q values of colors as follows, $$P=AX+BZ$$
$$Q=CX+DZ$$

designating the ratio $-$B/A as K, and assuming for convenience that $Y=1$, $(A+B)$ and $(C+D)$ must then each equal 1 so as to provide the desired normalizing on white. From these relations, it is readily found that $$A=\frac{1}{1-K},\ B=\frac{-K}{1-K},\ C=\frac{K}{K+1} \text{ and } D=\frac{1}{K+1}$$

For the preferred embodiment of the invention in which K is substantially equal to 0.23, $P=1.3X-0.3Z$ and $Q=.189X+0.811Z$.

Utilizing these primaries, the color television transmitter is then preferably arranged so that the proportionality factor $K_P$, relating variations in the P values of colors to be represented to corresponding variations in the transmitted signal, exceeds the proportionality factor $K_Q$, relating variations in the Q values of colors to be represented to corresponding variations in the transmitted signals, by a factor R which is substantially equal to the ratio of the maximum sensitivity of the average human eye for variations in only the P values of colors of any given brightness to the maximum sensitivity of the average human eye for variations in only the Q values of colors of the same brightness. In the preferred embodiment of the invention, R is substantially equal to two.

At the receiver, the color transmissions may be received and demodulated in the usual manner, to reproduce the video color signals derived at the transmitter. The separated color signals may then be passed through an appropriate matrix network for accomplishing transformation of the color coordinates with reference to which the colors are specified, so that the transmitted signals which specify the colors of image elements with respect to the transmission primaries P, Q and Y, are modified to specify these same colors with respect to the real red, green and blue primaries commonly employed for color image reproduction. The transformed signals from the matrix circuit then are supplied to the image-reproducing apparatus to control the formation of the final color image. This receiver preferably provides a relative gain for signals representative of variations in the Q values of colors, which is R times greater than would be employed in a system in which the proportionality factors $K_P$ and $K_Q$ were equal.

As a result of this choice of primaries and adjustment of transmitter and receiver gains, interfering electrical noise accompanying the signals in the receiver representative of variations in the P and Q values of colors, produce variations in chromaticity coordinates substantially exactly along the minor and major axes respectively of the eye-sensitivity ellipses, and in directions corresponding to the maximum and minimum sensitivity of the average human eye, respectively. The areas of confusion in objective chromaticity coordinates than comprise ellipses having their axes along those of the eye-sensitivity ellipses. Differences in relative gain accorded the P-representing signals and the Q-representing signals in the receiver, then affect the extent of subjective noise variations in directions substantially exactly along the minor and major axes of the eye-sensitivity ellipses, and thus permit optimum adjustment and equalization of the subjective noise accompanying these two signals.

At the same time, more nearly perfect equalization of the amplitude of subcarrier required to represent various chromaticities, and hence improved compatibility, are made possible, because of the closer correspondence between the system primaries P and Q and the chromaticities for which minimum and maximum amplitudes of resultant subcarrier signal are produced.

As will become apparent hereinafter, the use of the primaries P, Q and Y defines the form of the signal transmissions from the transmitter which are produced for any image. This relationship of the nature of the transmitted signal to the colors represented thereby, is of the essence of the invention, and accordingly the exact mechanism by means which the light stimuli from the televised scene are converted into color signal transmissions of the types specified, is not generally of primary importance to the invention in its broader aspects.

As will be set forth in detail hereinafter, there are a number of ways in which signals representative of the P and Q values of colors may be derived in a television system, as for example by first deriving signals representative of the X and Z values of the colors, and then combining these signals in the proportions indicated by the above equations to produce the P and Q signals.

Other objects and features of the invention will be more fully comprehended from a consideration of the following detailed description with reference to the accompanying drawings, in which.

The invention finds particular application to color television systems of the type which utilize a low-frequency band of frequency components for representation of the brightness of the televised scene, while representing the chromaticity of the scene by means of color-specifying parameters transmitted by amplitude modulation of differently-phased subcarrier signals of the same frequency, situated sufficiently above the high frequency end of the brightness signal band to prevent undesirable interaction therewith. The system of the above-cited copending application of Moore and Chatten is of this general type, and the details of components of the system are described clearly in that application. In particular, the Moore and Chatten application describes a system in which a low frequency brightness signal is derived, which varies in accordance with the Y values of the scene, while the chromaticity of the scene is represented by quadrature-related subcarrier signals of the same frequency, amplitude-modulated in accordance with the X—Y and Z—Y values of the scene respectively. A preferred embodiment of the present invention may be similar to that arrangement in general organization, except for the use of chromaticity-representing signals P—Y and Q—Y, rather than X—Y and Z—Y, and preferably also in the use of a subcarrier component ratio of two rather than three. Accordingly, it will be unnecessary to describe in detail all of the apparatus comprising the transmitter and receiver in accordance with the present invention, since much of this apparatus is either known in the art or described clearly in the Moore and Chatten application.

Figure 1:
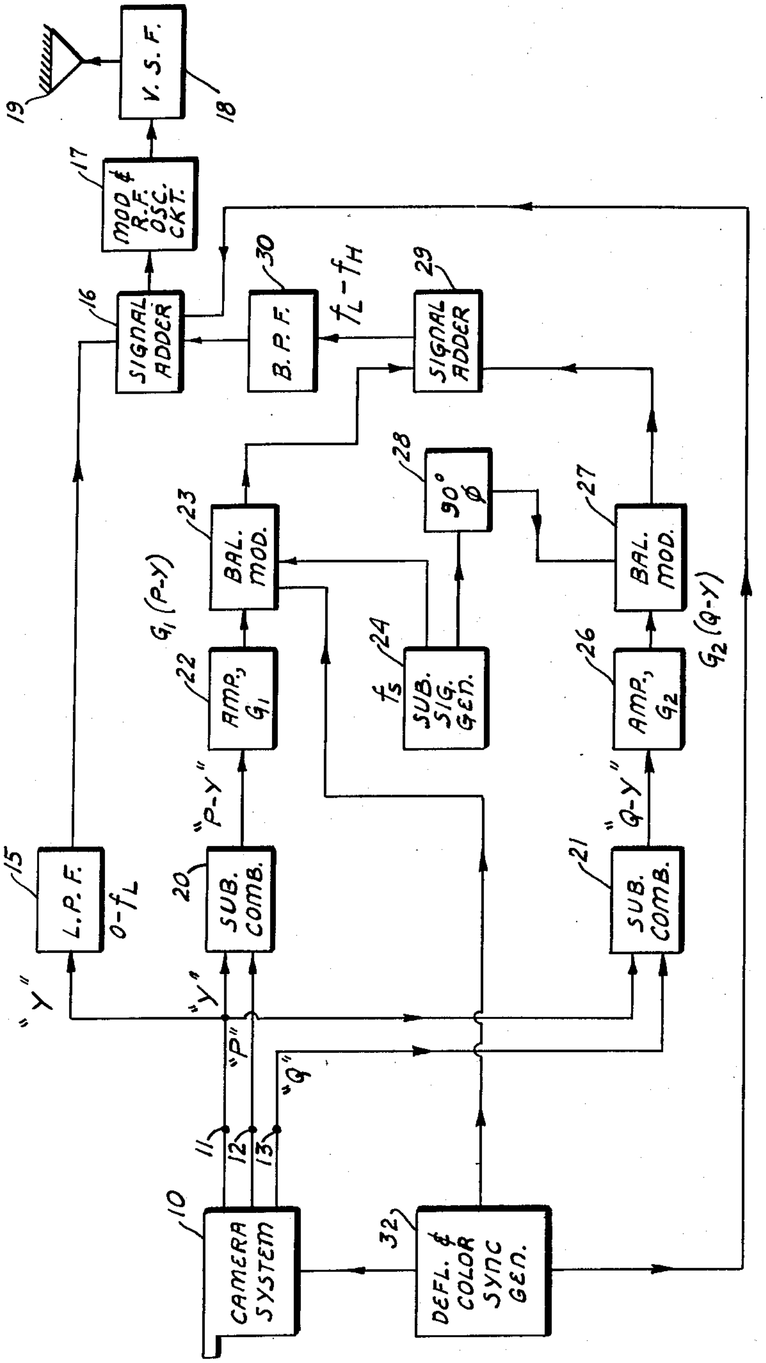
Figure 1 is a block diagram of the transmitter of a color television system, in accordance with my invention.

Referring specifically to Figure 1, there is represented a camera system 10 having output terminals 11, 12 and 13, at which terminals there are produced electrical signals which vary in proportion to the Y, P and Q values of the televised scene respectively. The nature and function of this camera system will be described in further detail hereinafter.

The Y signal from terminal 11 may be supplied through low pass filter 15 to signal adder 16, filter 15 preferably having a low-pass frequency characteristic characterized by an upper frequency limit $f_L$. The brightness signal at adder 16 may then be supplied through modulator and R.-F. oscillator circuit 17 to vestigial sideband filter 18, and thence to transmitting antenna 19 for transmission into space. This brightness signal channel of the transmitter may suitably comprise elements substantially identical with those utilized in the transmission of standard black-and-white television signals.

Primaries P and Q preferably have such units that, when representing a reference white, the P, Q and Y values of the image are substantially equal. It is therefore possible to utilize only the Y signal for representing black and white images, by forming P—Y and Q—Y signals to represent chromaticity variations. Accordingly, the P signal from terminal 12 may be supplied to subtractive combiner 20, as is the Y signal from terminal 11. Subtractive combiner 20 is operative in response to the P and Y signals to produce at its output terminal a signal which varies in accordance with the P—Y values of the image. Similarly, the Q signal from terminal 13 may be supplied to subtractive combiner 21, as is the Y signal from terminal 11, to produce at the output terminal of subtractive combiner 21 a signal proportional to the Q—Y values of the scene.

The P—Y signal may then be passed through amplifier 22 of predetermined gain, to balanced color modulator 23, wherein it is caused to amplitude modulate a reference sub-carrier signal supplied to balanced modulator 23 from sub-carrier signal generator 24.

Similarly, the Q—Y signal from combiner 21 is passed through amplifier 26 to balanced color modulator 27, wherein it is caused to amplitude modulate signals from subcarrier signal generator 24 which have been shifted in phase by 90° in passing through quadrature phase-shifting device 28. The arrangement of the balanced color modulators 23 and 27 is such that, in the absence of signals supplied thereto from amplifiers 22 and 26 respectively, no subcarrier signal is produced at the output terminals of the balanced modulators. This latter condition obtains whenever black-and-white images are represented. However, when the image possesses chroma, either or both color modulators 23 and 27 may supply output signals to signal adder 29, the sum of the signals from the two color modulators producing a single resultant subcarrier signal at the subcarrier signal frequency, with a phase depending upon the relative amplitudes of the individual output signals of the two color modulators.

The frequency $f_s$ of the subcarrier reference signal is preferably equal to an integral multiple of one-half the horizontal line-scanning frequency, to improve the compatibility of the system, as is described in detail in the above-cited applications.

The resultant subcarrier signal from adder 29 is supplied to bandpass filter 30, having a passband extending from frequency $f_L$ to a frequency $f_H$ situated above the subcarrier frequency $f_S$ by the amount $f_S-f_L$. A separate color subcarrier band adjacent the upper end of the brightness signal band is thereby delineated, having the subcarrier reference frequency at the center, and extending substantially equal distances on each side thereof.

The color subcarrier signal from bandpass filter 30 may then be combined with the brightness signal by means of conventional signal adder 16. The color subcarrier signal then passes through modulator and R.-F. oscillator circuit 17, vestigial sideband filter 18 and antenna 19 into space, along with the brightness signal.

In addition, the transmitter is preferably provided with deflection and color synchronizing signal generator 32, which supplies deflection synchronizing signals to camera system 10 to control the timing of the scanning operation in the camera in conventional manner, and which supplies pulses to balanced color modulator 23 during the blanking intervals immediately following each horizontal synchronizing pulse so as to unbalance the color modulator at such times, producing a burst of several cycles of color synchronizing signal at the subcarrier frequency and phase, which passes through the transmission channel and is radiated along with the color-specifying signals. Deflection and color synchronizing signal generator 32 also preferably provides conventional deflection synchronizing signals and a burst pedestal, the latter for raising the color burst sufficiently above the blanking level so that extreme excursions thereof will not penetrate the region of the image-representing signal reserved for picture delineation. These deflection synchronizing signals and the burst pedestal are combined in the composite transmitted signal by means of adder 16.

Further in accordance with the invention, the gains of amplifiers 22 and 26 may be adjusted in such manner that the proportionality constant $K_P$ relating the modulation of the output of color modulator 23 to variations in the P values of the image, exceeds the proportionality constant $K_Q$, relating modulation of the signal from color modulator 27 to variations in the Q values of the scene, by a factor R substantially equal to two. Although this ratio of proportionality constants may be effected by means of differences in the gains of the P—Y and Q—Y channels at substantially any point between camera system 10 and transmitting antenna 19, it is convenient to obtain this ratio by adjustment of the gains of amplifiers 22 and 26. Accordingly, the gain of amplifier 22, designated $G_1$, may equal twice the gain $G_2$ of amplifier 26, while the gains of other elements of the P—Y and Q—Y channels are substantially identical.

Figure 2:
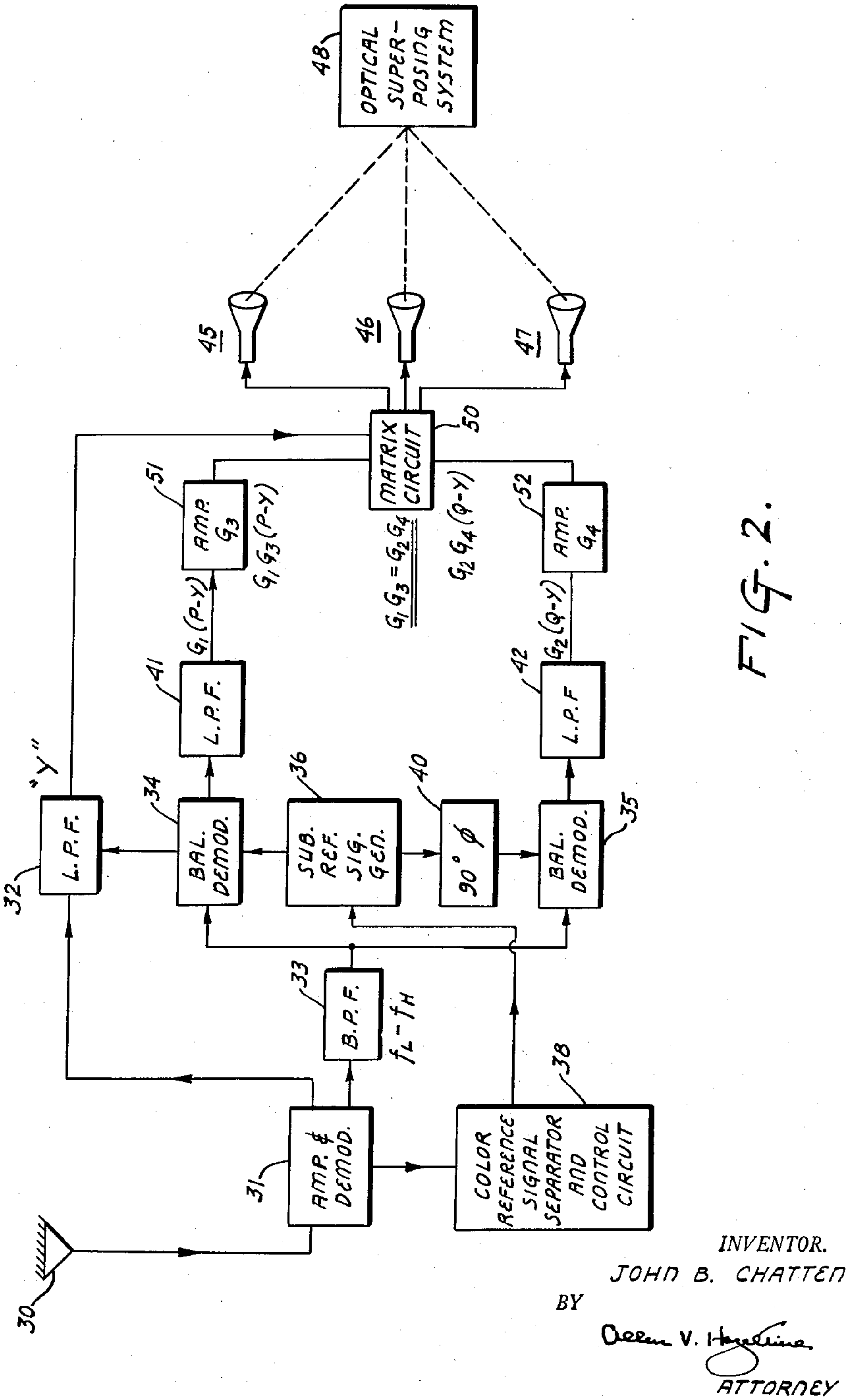
Figure 2 is a block diagram of a receiver adapted to receive the transmissions of the transmitter of Figure 1, in accordance with my invention.

Referring now to Figure 2, the receiver represented therein is operative to receive the signals from antenna 19 of Figure 1, and to produce in response thereto a color reproduction of the televised image. Since many of the general principles of operation, as well as the detailed arrangement, of various components of the receiver are similar to or substantially identical with those set forth in detail in the above-cited copending application of Moore and Chatten, it will not be necessary to describe with great particularity the components of the receiver of Figure 2.

Receiving antenna 30 is adapted to intercept the transmissions of transmitting antenna 19, and to supply them to amplifier and demodulator 31, at the output terminals of which there are produced video signals substantially identical with those at the output of adder 16 in the transmitter, except for the presence of additional noise which may be introduced in the space link between the transmitting and receiving antenna, or generated in amplifier and demodulator 31 and the input circuits thereto.

The output signals from amplifier and demodulator 31 may then be supplied to low pass filter 32, having a frequency characteristic substantially identical with that of low pass filter 15 at the transmitter. The output signal of filter 32 therefore comprises the separated frequency components of the brightness signal corresponding to the Y values of the televised scene. This Y signal may then be supplied to the image-reproducing portion of the receiver.

Output signals from amplifier and demodulator 31 are also supplied to bandpass filter 33, which may have a passband $f_L-f_H$ substantially identical with that of bandpass filter 30 at the transmitter, and is therefore operative to separate the color subcarrier signal and its sidebands. The separated color subcarrier signals may then be supplied to balanced color demodulators 34, 35, wherein separation is accomplished as between the P—Y and Q—Y components thereof. Each color demodulator is supplied with subcarrier reference signal from subcarrier reference signal generator 36, the phase and frequency of signals from generator 36 being controlled so as to be maintained substantially identical with those of the received color burst. This control may be accomplished through selection of the color burst from the output signal of amplifier and demodulator 31, by means of color reference signal separator and control circuit 38, which may comprise a filter for accomplishing the desired separation of the subcarrier reference signal, and means for utilizing this signal to control the frequency and phase of the subcarrier reference signal generator 36.

The subcarrier reference signals supplied to demodulators 34 and 35 differ in phase by 90°, those supplied to demodulators 34 and 35 corresponding in phase to those supplied to color modulators 23 and 27, respectively, at the transmitter. This quadrature relationship may readily be achieved by supplying the subcarrier reference signal to balanced demodulator 34 directly, while supplying it to color demodulator 35 through 90° phase-shifting device 40.

Color demodulators 34 and 35, together with subcarrier reference signal generator 36 and phase shifter 40, then cooperate to form a pair of synchronous detecting devices, the output signal of demodulator 34 comprising the P—Y component of the subcarrier modulation, while the output signal of demodulator 35 comprises the Q—Y component of the subcarrier modulation. To insure the removal of undesired components, such as subcarrier reference signal, which may accompany the P—Y and Q—Y signals, the latter signals may be passed through low pass filters 41 and 42 respectively, each having pass bands only wide enough to accommodate the desired chromaticity signal bandwidth.

The Y, P—Y and Q—Y signals thus produced are then used to control the formation of the color image at the receiver. In general, since the image-producing apparatus will utilize real primaries, a matrixing operation must be performed upon these signals in order to provide them in the proper forms and magnitude to effect proper image reproduction. While in some instances the image-displaying device may comprise a single tricolor cathode-ray tube, it will be convenient to describe the present invention with regard to an image-displaying system comprising three separate cathode-ray tubes 45, 46 and 47, each producing controllable amounts of different primary colors of light, such as red, green and blue respectively. The component-color images formed on these three tubes may then be combined in accurate registration by means of conventional optical superposing system 48, to produce the final reproduced color image.

To convert the Y, P—Y and Q—Y signals into suitable forms for application to the primary color-producing cathode-ray tubes, these latter signals are supplied to a matrix circuit 50, from which the output signal for each of the cathode-ray tubes is derived. The fact that color specifications in terms of any three primaries may be converted into corresponding specifications in terms of three other primaries, when the specifications of the primaries for each system are known, is well established in the art. Further, suitable matrixing circuits are also well known, which are adapted to receive three separate signals representative of the constitution of colors with respect to a first set of primaries, and to supply these signals to each of three real primary-color producing devices such as tubes 45, 46 and 47 in appropriate amounts to effect proper image reproduction. For example, the signal supplied to red-producing cathode-ray tube 45 is composed of predetermined proportions of the Y, P—Y and Q—Y signals. Supplying of these signals in their proper proportions may be insured by passing the Y, P—Y and Q—Y signals through circuits of appropriate gain before combination for application to tube 45. Similar arrangements may be employed in synthesizing signals supplied to tubes 46 and 47. Since such arrangements are well known in the art, and the principles thereof are well established, it will be unnecessary to represent the specific matrix circuits in detail. However, it is understood that, since the Y signal contains all of the brightness information, the matrixing circuit is generally operative to supply the Y signal to the three cathode-ray tubes in such proportions that the final combined image of the three tubes varies only in brightness, and not in chromaticity, in response to variations in the received Y signal.

In the particular embodiment of the invention represented in Figure 2, the P—Y and Q—Y signals are passed through amplifiers 51 and 52 having gains $G_3$ and $G_4$ respectively, before application to matrixing circuit 50. The ratio $G_3/G_4$ of the gains of amplifiers 51 and 52 is preferably inverse to the ratio $G_1/G_2$ of the gains of amplifiers 22 and 26 at the transmitter. Thus, in the preferred embodiment, the P—Y signal at the receiver is preferably amplified by only one-half the gain accorded the Q—Y signal, so that the P—Y and Q—Y signals supplied to matrixing circuit 50 are then related to variations in the P—Y and Q—Y values of the televised scene, by the same proportionality constant. The matrixing circuit 50 may therefore be designed on the basis of equal amounts of P—Y and Q—Y signals supplied to the input terminals thereof.

Actually, the difference in relative gain accorded the P—Y and Q—Y signals at the receiver, represented by the ratio $G_1/G_2$, may be provided at almost any point in the receiver channel. Thus, it may actually be provided within the matrixing network, for example, and the amplifiers 51 and 52 are shown separate from the matrixing network principally for clarity in subsequent discussion.

It should be understood that appropriate arrangements (not shown) are employed for synchronizing the deflections of the receiver cathode-ray tube beams with the scanning of the camera device at the transmitter.

Figure 3:
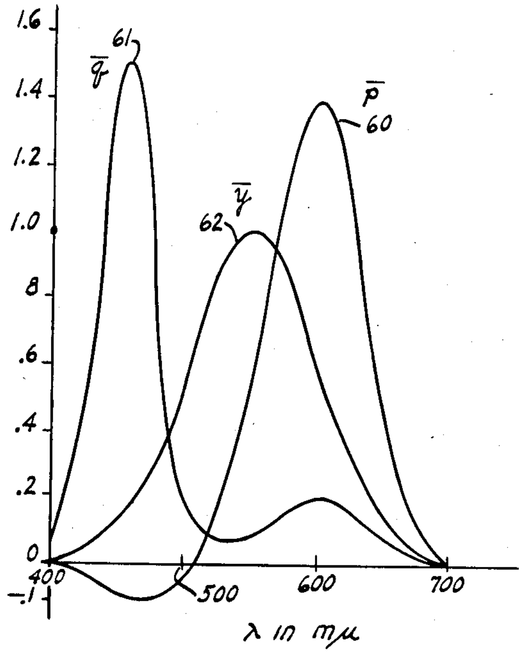
Figure 3 is a graphical representation to which reference will be made in describing the nature of the invention.

The nature of the primaries P and Q may be defined by specification of their X, Y and Z values. Thus, the X, Y and Z values of the primary P are $1/1-K$, 0, and $-K/1-K$ and of the primary Q are $K/K+1$, 0, and $$\frac{1}{K+1}$$

respectively, where K has a value lying between zero and one-half and is preferably substantially equal to 0.23. However, the nature of these new primaries is further clarified by their mixture curves, or distribution coefficients, which are shown in Figure 3 for the preferred embodiment of the invention. The curves 60, 61 and 62 represent, respectively, the mixture curves for the P, Q and Y primaries. In this graph, the abscissae represent wavelengths of light, expressed in millimicrons, in the range 400 to 700, while the ordinates represent amounts of light. This graph is analogous to that commonly utilized to represent the X, Y and Z mixture curves, except that the standard primaries X and Z have been replaced by the new primaries P and Q.

The ordinates of the curves 60, 61 and 62, at any value of abscissa, represent the relative quantities of the three primaries necessary to match or represent the spectrum color defined by the abscissa frequency. Methods will readily occur to one skilled in the art for determining similar mixture curves for embodiments of the invention other than the preferred one, for which the value of K lies between zero and one-half, but is other than 0.23.

Figure 4:
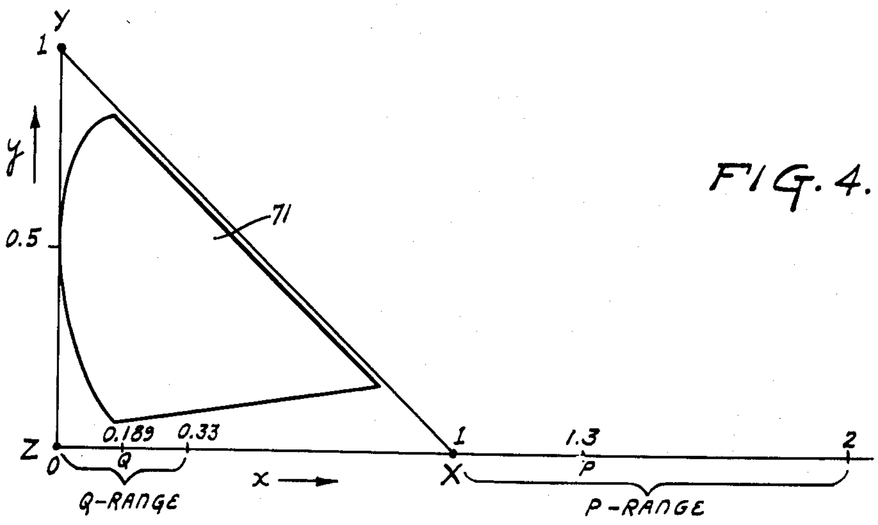
Figure 4 is another graphical representation which is useful in explaining the invention.

Figure 4 indicates the positions of the new primaries P and Q with relation to a conventional XYZ chromaticity diagram. In this graph, ordinates represent $y$, which equals $$\frac{Y}{X+Y+Z}$$

and abscissae represent $x$, which equals $$\frac{X}{X+Y+Z}$$

The vertex of the triangle at Z represents the position of the Z primary, while the vertices marked X and Y represent the positions of the X and Y primaries. These standard primaries lie outside the spectrum locus 71, and they are therefore imaginary. The primaries P and Q are also imaginary, and are preferably located at the points ($x=1.3$, $y=0$) and ($x=0.189$, $y=0$) respectively. However, as will become apparent hereinafter, while the primaries P and Q are preferably at these latter positions in Figure 4, advantages of the invention will obtain whenever the primaries P and Q are within a substantial range extending on either side of these points. Thus, so long as the P primary lies between the points $x=1$ and $x=2$, while the primary Q lies at a position between the points $x=0$ and $x=1/3$, improvements will be obtained in accordance with the invention. These ranges for the positions of primaries P and Q for which improved operation obtains, are represented in Figure 4 by the correspondingly labeled brackets.

Figure 5A:
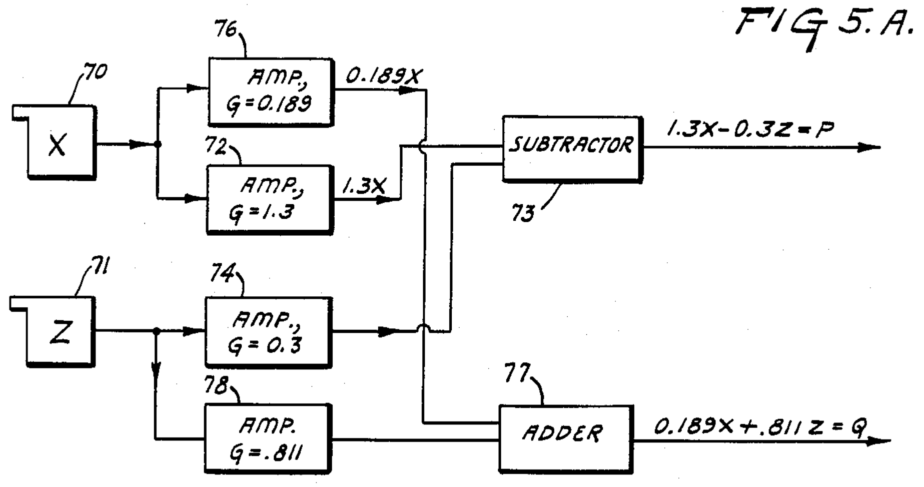
Figures 5A, 5B and 5C are block diagrams illustrating a variety of apparatus for deriving signals representative of the P and Q values of light, in accordance with the invention.

In order to obtain electrical signals whose variations are proportional to the variations in the P and Q values of colors, any of a variety of arrangements may be employed. Referring to Figure 5A, the camera system 10 of Figure 1 may comprise X- and Z-taking devices 70 and 71 which have over-all taking characteristics approximating the X and Z distribution coefficients, and which therefore produce signal variations proportional to the X and Z values of image elements, respectively. The X signal may then be passed through amplifier 72, characterized by a gain of substantially 1.3 in a preferred embodiment, to subtractor 73, while the Z-representing signal may be passed through amplifier 74, preferably having a gain of substantially 0.3 in the same preferred embodiment, and thence to the above-mentioned subtractor 73. Subtractor 73 is then operative to produce at its output terminals a signal representing the difference $1.3X-0.3Z$, which is the desired P signal.

To form the Q signal, the X signal may be passed through amplifier 76, in this case preferably characterized by a gain of substantially .189, to signal adder 77, while the Z signal is supplied through amplifier 78, preferably having a gain of .811, to the same signal adding device. The output of adder 77 then represents the sum $.189X+.811Z$, which comprises the desired P signal.

Figure 5B:
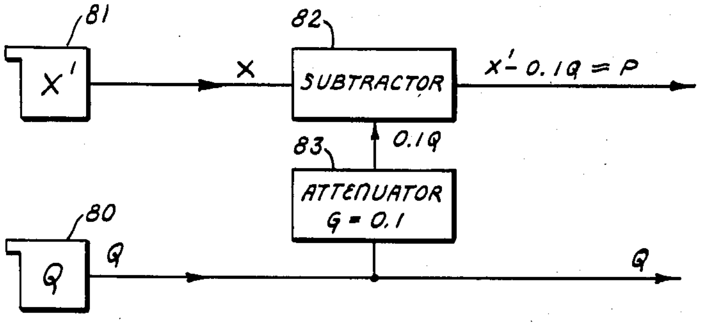

An alternative camera arrangement is shown in Figure 5B, in which the Q signals are derived directly by optical filtering devices suitably chosen in accordance with the spectral characteristics of the complete camera system, while the P signal is obtained by deriving an X' signal and subtracting therefrom a portion of the Q signal. In this instance, the X' signal corresponds to a primary having a mixture curve which is similar to that of the standard X primary, but in which the minor peak of the X mixture curve is absent. The major peak of the X curve is sufficiently similar to the positive portion of the P mixture curve, so that in certain instances it may be substituted therefor. To obtain the negative portion of the P mixture curve, a small portion of the Q mixture curve is therefore subtracted from the X' curve.

Accordingly, one may employ a camera taking device 80 for deriving signals representative of variations in the Q values of image elements, and another camera taking device 81 for producing signals representative of variations in the X' values of these elements. The Q signal is then used directly as one primary signal, and is supplied to subtractor 82 by way of attenuator 83, having a gain of substantially 0.1. The X' signal is also supplied to subtractor 82, which produces at its output terminals a signal $X'-0.1Q$, which approximates closely the desired P signal.

Figure 5C:
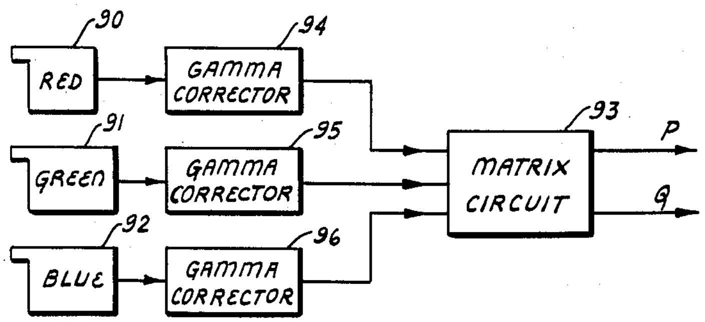

Another method for obtaining the P and Q signals, as represented in Figure 5C, utilizes red, green and blue taking devices 90, 91 and 92 respectively, for supplying signals representative of the red, blue and green components of the image, to an appropriate matrix circuit 93, wherein they may be combined in appropriate proportion to produce the desired P and Q signals at the output of the matrixing circuit. As indicated hereinbefore, such matrixing networks for effectively transforming the color coordinates of specification, are well known in the art. The arrangement of Figure 5C is particularly convenient because separate gamma correctors 94, 95 and 96 may be inserted in the red, green and blue channels respectively, to provide convenient control of the gamma of the reproduced image.

Figure 6:
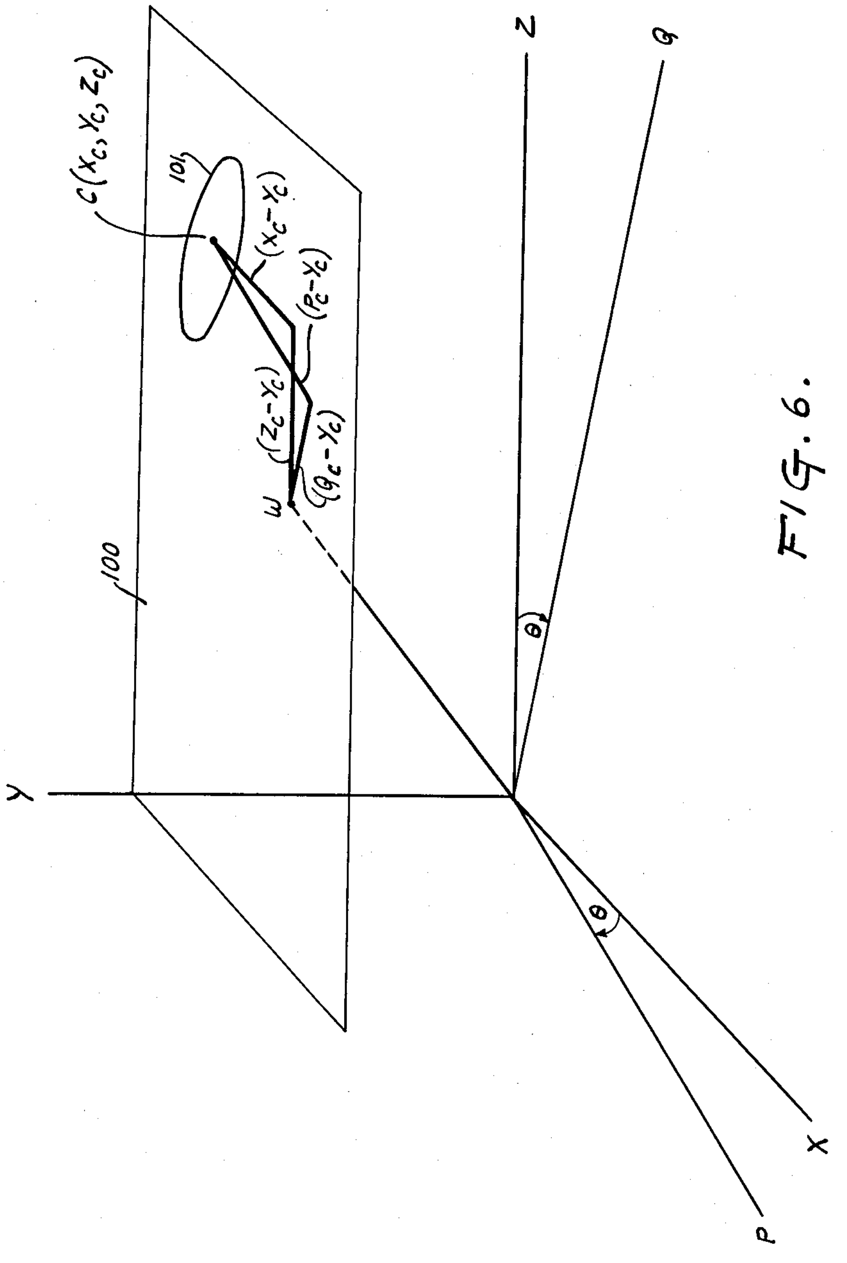
Figure 6 is a graphical representation which will be useful in explaining the mode of operation of the invention.
Figure 7:
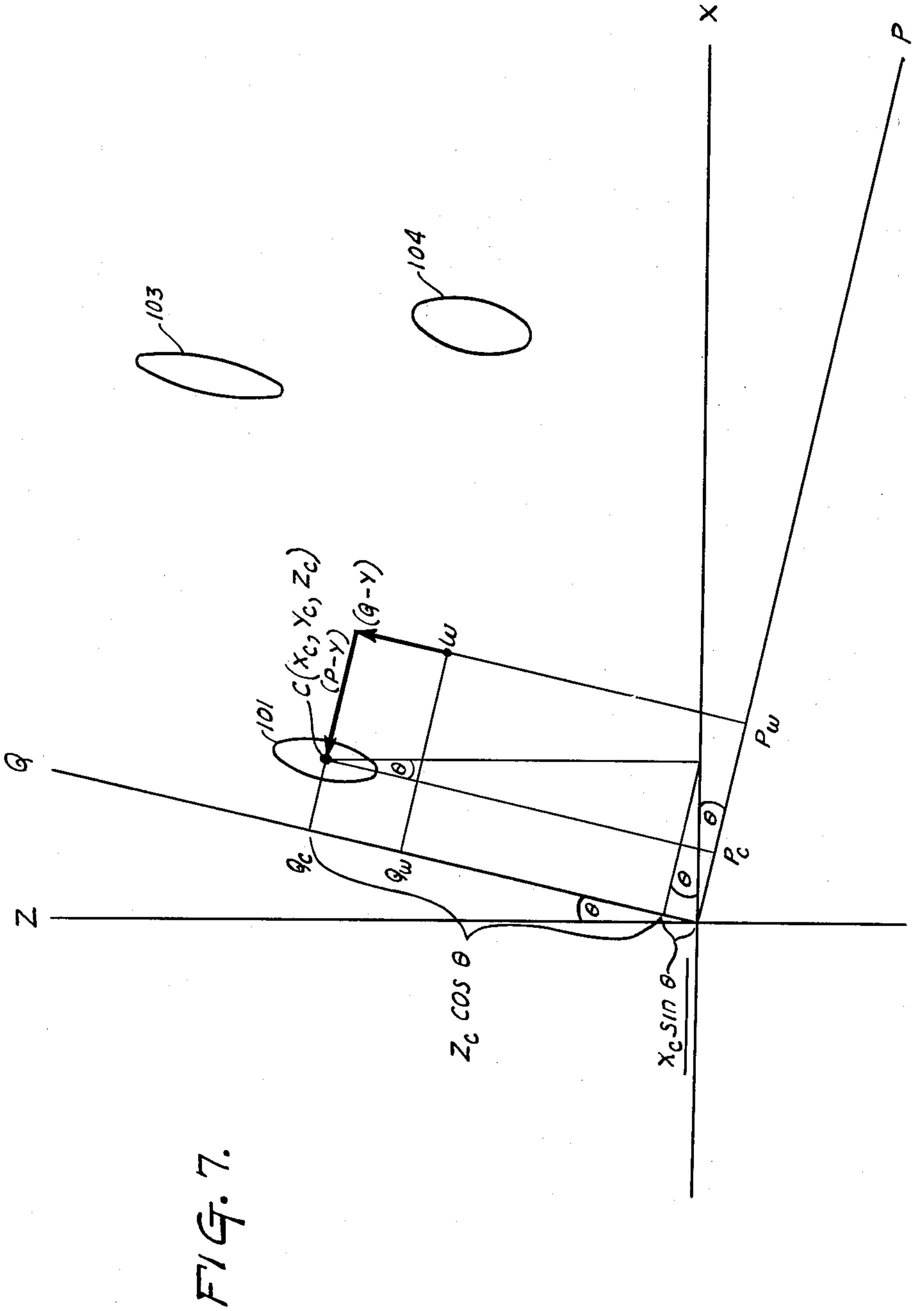
Figures 7 and 8 are further graphical representations to which reference will be made in describing the theory and operation of my invention.
Figure 8:
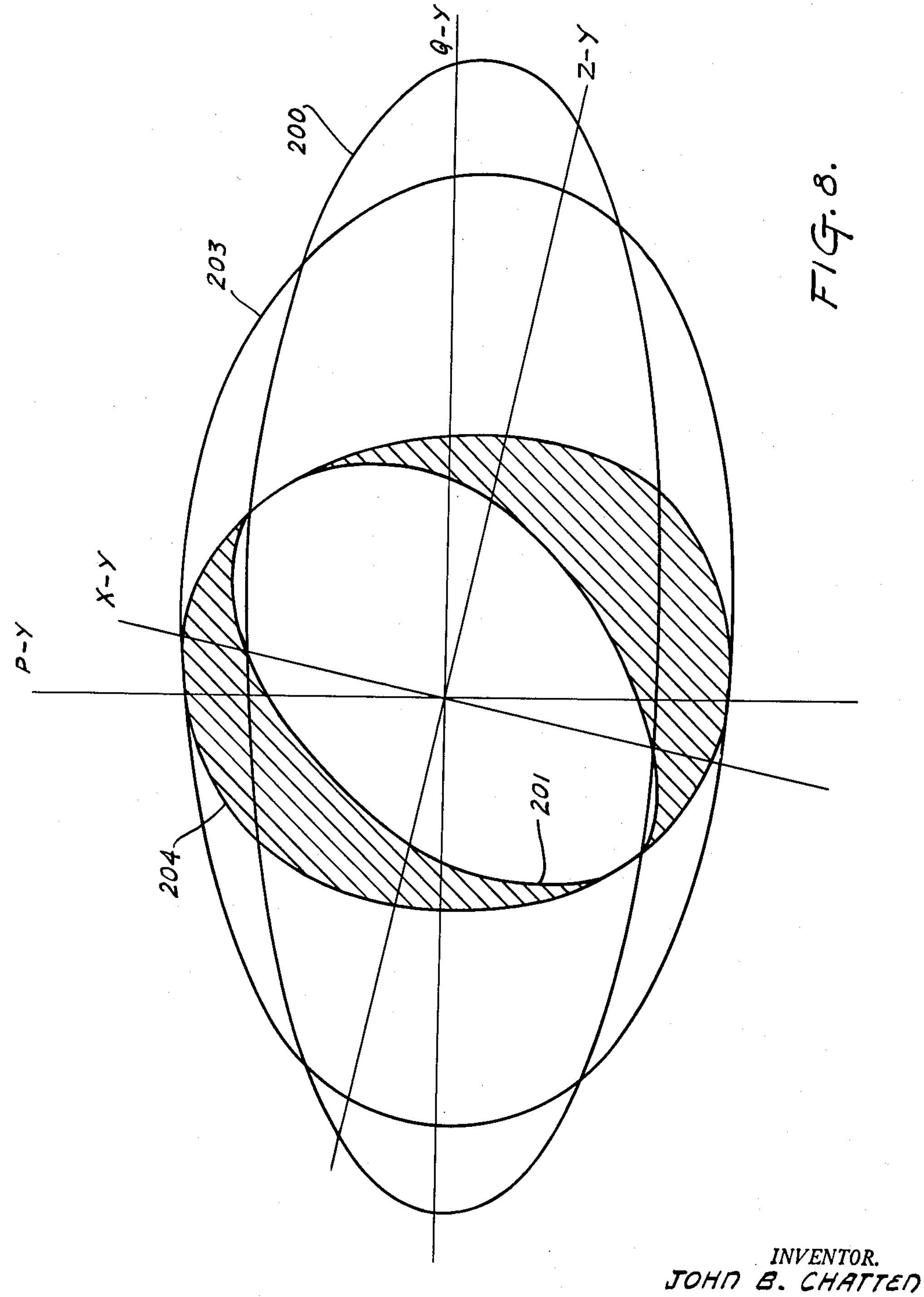

The theory and operation of the invention will be understood more fully by reference to Figures 6, 7 and 8. In Figure 6, there are shown graphically the colorimetric relations existing in a system of the type described hereinbefore. The three orthogonal coordinate axes represent the directions of increasing values of X, Y and Z, and 100 represents a particular brightness plane, containing a color point C having the coordinates $X_C$, $Y_C$, $Z_C$ in the XYZ system. The brightness plane 100 corresponds to any arbitrarily-selected image brightness produced at the receiver in response to the Y signal, and variations within this brightness plane are accomplished in response to changes in the modulated subcarrier signal representing chromaticity variations. In an XYZ color television system such as that of the above mentioned Bingley application, the white point W would be represented at the receiver in the absence of subcarrier signal. The X—Y signal, however, deviates the color point in a direction parallel to the X axis, while the Z—Y signal deviates the color point parallel to the Z axis, both by such amounts as to displace the desired position at C. Also shown is an eye-sensitivity ellipse 101, which represents, by its distances from the point C, the relative variations in objective chromaticity which must be produced about point C to produce the same subjective effect of color change. Thus, the direction of the major axis of the ellipse is the direction of minimum subjective sensitivity to changes in chromaticity, while the direction of the minor axis corresponds to the direction of maximum eye sensitivity to chromaticity changes.

Also shown are the axes P and Q, which, together with the Y axis, are utilized in accordance with the invention to define the positions of color points. With this system of the invention, the same white point W is produced in response to the Y signal alone, but chromaticity deviations are produced by the P—Y signals in a direction parallel to the P axis, and by the P—Y signals in a direction parallel to the Q axis, these deviations being of appropriate magnitudes to displace the resultant color point to the same desired position at C. As will become apparent hereinafter with reference to Figure 7, the advantages of the invention derive at least in part from the fact that the use of the primaries P and Q causes the chromaticity deviations in the constant brightness plane 100 to occur in directions which are more nearly parallel to the directions of the major and minor axes of the eye sensitivity ellipses for various color points.

Referring now to Figure 7, there is shown a top view of a typical constant-brightness plane such as 100 of Figure 6. Also shown are a number of additional eye sensitivity ellipses such as 103 and 104, for example. The major axes of these ellipses are all substantially parallel one to the other, but they are not exactly parallel to either the Z or X axis of coordinates. Thus, although the major axes are in most cases generally along the direction of the Z axis, a substantial angle exists between the directions of the major axes and the direction of the Z axis. This angle is of the order of 13°. In accordance with the invention, primaries P and Q are chosen so that changes in the P values of colors are represented by motion of the color point in a direction substantially parallel to the direction of the minor axes of the majority of eye-snesitivity ellipses, while the Q primary is so chosen that variations in the Q values of colors displace the color point substantially parallel to the directions of the major axes of the majority of the eye sensitivity ellipses. Thus, the P and Q axes corresponding to the new P and Q primaries are more nearly parallel to the major and minor axes of the eye sensitivity ellipses than are the Z and X axes formerly employed. By this means certain system advantages are obtained, the nature of which will be discussed in further detail hereinafter. It will be apparent that the change to primaries P and Q corresponds to a rotation of the coordinates X and Z, and that improvements in accordance with the invention may be obtained so long as this rotation results in primary axes for P and Q which are more nearly parallel to the major and minor axes of the eye sensitivity ellipses than are the X and Z axes. Thus, rotation of the chromaticity coordinate axes by amounts between zero and 26 degrees will produce improvements in this respect.

The mathematical expressions for the new primaries P and Q in terms of the original primaries X and Z may be derived in any of a number of ways, some of which will readily occur to those skilled in the art. For example, they may be derived by application of the well-known methods of rotation of coordinates. However, additional physical characteristics of the system will become apparent from the following simplified type of analysis.

Referring to Figure 7, it is apparent that when X and Z are zero, P and Q are also zero. However, as the Q value only of a color point is increased from zero, the length of the projection of the abscissa of the color point, upon the Q axis, increases linearly. Representing the distance from the origin to the projection of the color point on the Q axis as Q′, $$Q'=X\sin\theta$$

where $\theta$ is the angle by which the Q axis has been rotated clockwise from the Z axis. Now as the Z value of the color point is also increased from zero, Q′ increases further in a linear fashion, and by an amount Z cos $\theta$. The relative contributions of the X and Z values of a color to the Q value thereof are therefore proportional to sin $\theta$ and cos $\theta$ respectively. The above relationships may be expressed by the equation:

$$Q'=X\sin\theta+Z\cos\theta$$

From similar considerations, it will be apparent that the distance P′, from the origin to the projection of the color point upon the P axis, is given by the expression:

$$P'=X\cos\theta-Z\sin\theta$$

Since the units of the new primaries P and Q may be chosen according to convenience, and will in general differ from the units of X and Z, the P value of a color may be represented by the expression:

$$P=K_1(X\cos\theta-Z\sin\theta)$$

and the Q value by the expression:

$$Q=K_2(X\sin\theta+Z\cos\theta)$$

From these expressions, it is apparent that the P value of a color is equal to A times the standard X value thereof, and B times the standard Z value thereof, where:

$$A=K_1\cos\theta,\text{ and}$$
$$B=-K_1\sin\theta$$

Similarly, the Q value of a color is equal to C times the standard X value thereof, and D times the standard Z value thereof, where:

$$C=K_2\sin\theta,\text{ and}$$
$$D=K_2\cos\theta$$

Significant factors in the above definitions are the ratios among the constants A, B, C and D. It is apparent from the foregoing that the ratio $$\frac{C}{D}=\frac{\sin\theta}{\cos\theta}=\tan\theta$$

and will be designated hereinafter by the symbol K. Further, the ratio $$-\frac{B}{A}=\frac{\sin\theta}{\cos\theta}=\tan\theta=K$$

where K is the same constant, and is typical of the specific system arrangement. In particular, K is a function of $\theta$ only, and hence is determined only by the angular displacement of the P and Q axes from the X and Z axes.

Since the directions of the major and minor axes of the eye-sensitivity ellipses differ from those of the Z and X axes by approximately 13°, improvements in accordance with the invention will be obtained whenever $\theta$ lies between zero and 26°, for in this range the axes of P and Q will be more nearly parallel to the major and minor axes of the eye-sensitivity ellipses than are the standard X and Z axes. In arrangements of the invention, therefore, the constant K, which equals tan $\theta$ and represents the ratio of C to D, lies between zero and substantially one-half. In the preferred embodiment of the invention, $\theta$ is substantially equal to 13°, and K is therefore substantially 0.23.

While the projection lengths P′ and Q′ are determined only by geometrical considerations, the actual primaries P and Q are also determined by the units chosen therefor. In applications of the invention to color television systems of the general class described hereinbefore, it is desirable in the preferred embodiment that the color difference signals each equal zero when representing achromatic subject matter, so as to avoid the unnecessary generation of subcarrier signal at such times. Since it is convenient to utilize color difference signals of the form P—Y and Q—Y, the P, Q, Y, X and Z values of the white point W should therefore preferably all be equal. Then, for white, $$P_W=K_1(P_W\cos\theta-P_W\sin\theta)$$

and $$Q_W=K_2(Q_W\sin\theta+Q_W\cos\theta)$$

where the subscripts W indicate values on white. Solving these equations provides the following expressions for $K_1$ and $K_2$:

$$K_1=\frac{1}{\cos\theta-\sin\theta}$$

$$K_2=\frac{1}{\sin\theta+\cos\theta}$$

Then, in general, $$A=\frac{\cos\theta}{\cos\theta-\sin\theta}$$

$$B=\frac{-\sin\theta}{\cos\theta-\sin\theta}$$

$$C=\frac{\sin\theta}{\sin\theta+\cos\theta}$$

and $$D=\frac{\cos\theta}{\sin\theta+\cos\theta}$$

In terms of the constant K, $$A=\frac{1}{1-K},\ B=\frac{-K}{1-K},\ C=\frac{K}{K+1},\text{ and } D=\frac{1}{K+1}$$

For the preferred embodiment of the invention, in which $K=0.23$, it follows that:

$$P=1.3X-0.3Z$$

and $$Q=0.189X+0.811Z$$

The advantages of the invention may be considered to derive from the fact that, the more nearly equal are the subjective chromaticity variations in the reproduced color image, produced in various directions by equal interfering signals, and the more nearly equal are the maximum amplitudes of transmitted color subcarrier required to represent the gamut of colors which is utilized, the better are the noise and compatibility of the color television system of the general class described hereinbefore. The first condition above, involving improved equalization of subjective chromaticity variations, is attained by utilizing the primaries P and Q, with respect to variations in which the average human eye has preferably substantially its maximum and minimum sensitivities, as indicated in Figure 8 by the decreased angle between the Q and P axes and the major and minor axes of the eye-sensitivity ellipses, respectively. Because of this arrangement, differences in gains accorded the P- and Q-representing signals at the receiver, vary the major and minor axes of the areas of subjective confusion more nearly, and preferably exactly, along the major and minor axes of the corresponding eye-sensitivity ellipses. Accordingly, if desired, the circular area of objective confusion in chromaticity coordinates which would be produced by the use of equal gains for the P- and Q-representing signals, can be elongated more nearly along the major axis of the eye-sensitivity by transmitting the Q-representing signal with reduced relative gain and according it correspondingly increased gain at the receiver. In the preferred embodiment, this elongation may be substantially exactly along the major axis of the corresponding eye-sensitivity ellipse, so that substantially exact matching of the area of objective chromaticity variations to the corresponding eye-sensitivity ellipse may be accomplished for any chosen chromaticity. The area of subjective confusion will then be substantially circular for that chromaticity point, indicating substantially complete equalization of subjective chromaticity variations.

In the preferred embodiment, the ratio of gains $G_1/G_2$ at the transmitter is substantially equal to the ratio of the maximum sensitivity of the average human eye for variations in only the P values of colors of any given brightness, to the maximum sensitivity of the average human eye to variations in only the Q values of colors of the same brightness (i. e. 2:1). By this adjustment, improved equalization of chromaticity changes due to noise is obtained for substantially all chromaticities, without adversely affecting this equalization for any chromaticity utilized.

The accompanying advantage, by virtue of which there is obtained improved equalization in the amplitudes of sub-carrier required to represent the gamut of transmitted colors, is indicated in Figure 8. Shown therein are the axis of ordinates representing values of X—Y signal, and the axis of abscissae representing values of Z—Y signal. Ellipse 200 then represents the maximum values of X—Y and Z—Y signals required to represent various hues. These maximum values are represented by the lengths of vectors drawn from the coordinate origin to ellipse 200, each angular position of the vector corresponding to a different hue. As is set forth fully in the above-cited application of Moore and Chatten, ellipse 200 corresponds to the condition in which X—Y and Z—Y signals are transmtited in equal proportions. In accordance with one aspect of that invention of Moore and Chatten, the proportion of Z—Y signal transmitted may be made substantially one-third of the proportion of X—Y signal transmitted, thereby producing the more-nearly circular ellipse 201. This ellipse indicates that the amplitudes of subcarrier required for various chromaticities are more nearly equalized, resulting in improved compatibility of the system. However, it will be apparent that, by this previous arrangement, it will not be possible to produce perfect equalization, represented by a truly circular graph. This is because the direction of contraction of the ellipse 200 obtained by reducing the proportion of Z—Y signal transmitted relative to the proportion of X—Y signal, is not exactly along the major axis of the ellipse. Instead, ellipses such as 201 with major axes rotated from that of ellipse 200 are obtained, which, while representing substantial improvements, are inherently incapable of becoming ideal circles.

However, when P and Q primaries are utilized in accordance with the present invention, substantially perfect equalization is possible. This is because the axes P—Y and Q—Y may be caused to lie in the same directions as the major and minor axes, respectively, of the subcarrier demand ellipse 200.

For example, in Figure 8 there are also shown the positions of axes P—Y and Q—Y in accordance with the preferred embodiment of the invention, which coincide substantially identically with the axes of ellipse 203, representing the maximum demand curve for P—Y and Q—Y signals. By reducing the proportion of Q—Y signals by a factor of two, the substantially circular curve 204 is obtained. The maximum value of subcarrier for curve 204 is substantially the same as that for ellipse 201, but the shaded regions between the curves indicate the fact that for most hues, the apparatus of the invention provides greater subcarrier amplitudes, and hence better noise performance for substantially the same compatibility.

Although the invention has been described with reference to certain specific embodiments thereof, it is susceptible of application to a variety of widely-differing systems, as will be apparent to one skilled in the art. Thus, it is obviously applicable to systems in which the P and Q values are represented in other forms, as by transmission of signals representative only of P and Q, rather than P—Y and Q—Y. Further, the P- and Q-representing signals need not be generated at early points in the transmitter and passed through separate channels to a later combination point, so long as the final transmitted signal contains components as specified by the invention. Neither is it necessary that the receiver be limited to any particular form of image-displaying device. Thus one may employ a single tricolor cathode-ray tube for image display, in which event it is sometimes possible to supply the chromaticity-representing signals to the tube without previously separating the signal components controlling the various primary colors.

It will also be apparent that the Y signal may, in some embodiments of the invention, be modified in amplitude prior to subtraction from the P- and Q-representing signals, so as to provide color-difference signals of the form $(P-mY)$ and $(Q-mY)$. In this event, the color-difference signals may still be caused to approach zero when representing achromatic subject matter, by appropriate choice of the units for P and Q, in accordance with principles set forth hereinbefore and utilizing the fact that the P and Q values on white will then equal $mY$, $mX$ and $mZ$.

I claim:

1. In a system for the transmission of intelligence representative of the chromaticity of image elements: first means for producing a first signal containing amplitude variations representative of variations in the P values of light from said image elements, said P values being substantially equal to 1.3 times the standard X values of said light minus 0.3 times the standard Z values of said light; second means for generating a second signal containing amplitude variations representative of variations in the Q values of light from said image elements, said Q values being substantially equal to the sum of 0.189 times said standard X values of said light and 0.811 times said standard Z values thereof; and means for transmitting said first and said second signals in an amplitude-ratio of substantially two-to-one.

2. The system of claim 1, in which said means for transmitting said first and said second signals comprises means for generating a periodic signal and for modulating the amplitude and phase of said periodic signal with said first and said second signals.

3. The system of claim 1, in which said means for transmitting said P-representing signal and said Q-representing signal comprises a source of a first and a second periodic signal of common frequency but differing phases, and means for amplitude-modulating said first and second periodic signals with said P-representing signal and said Q-representing signal respectively.

4. The system of claim 3, in which said first and said second periodic signals are substantially in phase quadrature.

5. In a system for the transmission of intelligence representative of the chromaticity of image elements: first means for producing a first signal containing amplitude variations representative of variations in the P values of light from said image elements, said P values being substantially equal to 1.3 times the standard X values of said light minus 0.3 times the standard Z values of said light; second means for generating a second signal containing amplitude variations representative of variations in the Q values of light from said image elements, said Q values being substantially equal to the sum of 0.189 times said standard X values of said light and 0.811 times said standard Z values thereof; means for generating a third signal representative of the standard Y values of said light from said image elements; means for subtracting said third signal from said P-representing signal and from said Q-representing signal, to form a pair of color-difference signals; and means for transmitting said P—Y and Q—Y signals in an amplitude ratio of substantially two-to-one.

6. A system in accordance with claim 5, comprising in addition means for transmitting said third signal together with said color-difference signals to form a complete color-specifying transmission.

7. In a system for the transmission of intelligence representative of the chromaticity of image elements: first means for producing a first signal whose amplitude variations are related by a proportionality constant $K_P$ up variations in the P values of light from said image elements, said P values being substantially equal to the sum of 1.3 times the standard X values of said light minus 0.3 times the standard Z values of said light; second means for generating a second signal comprising amplitude variations related by a proportionality constant $K_Q$ to variations in only the Q values of light from said image elements, said Q values being substantially equal to the sum of 0.189 times said standard X values of said light and 0.811 times said standard Z values thereof; said proportionality constant $K_P$ exceeding said proportionality constant $K_Q$ by a predetermined factor substantially equal to two; and means for transmitting said first and said second signals as chromaticity-representing intelligence.

8. The system of claim 7, in which said means for transmitting said first and said second signals comprises means for generating a pair of subcarrier signals of common frequency but differing phases, and for amplitude-modulating said subcarrier signals with said first and second signals respectively.

9. The system of claim 8, comprising in addition means for deriving a third signal representative of variations in the standard Y values of said image elements, for subtracting said third signal from said first and second signals respectively prior to amplitude modulation of said subcarrier signals, and for transmitting said third signal to produce a complete color-specifying transmission.

10. In a system for the transmission of intelligence representative of the chromaticity of image elements; first electro-optical means for analyzing light from said image elements to derive a first signal containing amplitude variations representative of the specification of said image elements with respect to a primary P having standard chromaticity coordinates $x_P$ and $y_P$, where $x_P$ has a value substantially equal to 1.3, and $y_P$ is substantially zero; second electro-optical means for analyzing said light from said image elements to derive a second signal containing amplitude variations representative of the specification of said image elements with respect to a primary Q having standard chromaticity coordinates $x_Q$ and $y_Q$, where $x_Q$ is substantially equal to 0.189 and $y_Q$ is substantially zero; and means for transmitting said first and second signals as amplitude-modulation of carrier-wave signals and in an amplitude ratio of substantially two-to-one.

11. The system of claim 10, in which said means for transmitting said P-specifying and said Q-specifying signals comprises means for generating first and second periodic signal components of common frequency but differing phases, and for amplitude-modulating said first and second periodic signal components with said P-specifying and said Q-specifying signals respectively; and comprising, in addition, means for generating a signal representative of the brightness of said image elements and for transmitting said brightness-representing signal.

12. A system for the translation of intelligence as to the chromaticity of light from image elements, said system comprising: a transmitter for generating and for transmitting signals representative of the P and Q values of said light, said P values being substantially equal to the sum of A times the standard X values of said light and B times the standard Z values of said light, where the ratio of B to A lies between zero and minus one-half, said Q values being substantially equal to the sum of C times said standard X values and D times said standard Z values, where the ratio of C to D is substantially equal to the negative of said ratio of B to A; a receiver comprising an image-reproducing portion adapted to produce light of predetermined primary colors in controllable amounts; and means included in said receiver for receiving said transmitted signals, said last-named means comprising signal-amplitude modifying apparatus for supplying said received signals to said image-reproducing portion of said receiver in appropriate quantities to control the reproduction therein of the chromaticity of said image elements.

13. The system of claim 12, in which: said transmitter comprises first gain-determining means adjusted to provide a predetermined component ratio R, between variations produced in said transmitted P-representing signal in response to a unit change in only said P value of said image elements, and variations produced in said transmitted Q-representing signal in response to a unit change in only said Q value of said image elements, said ratio R differing from unity; and in which said signal-amplitude modifying apparatus comprises means, responsive to P- and Q-representing signals characterized by a component ratio R equal to unity, to effect reproduction of the chromaticity of said image elements, and also comprises additional means for further modifying said received P- and Q-representing signals to amplify said Q-representing signal by an amount which is R times greater than the amplification provided thereby for said P-representing signal.

14. The system of claim 12, in which said means for generating and transmitting said P- and Q-representing signals comprises a source of a first and a second periodic signal, said periodic signals being of common frequency but differing phase, and means for amplitude-modulating said first and second periodic signals with said P-representing signal and said Q-representing signal respectively.

15. The system of claim 14, comprising, in addition, means for deriving a signal representative of variations in the standard Y values of said image elements, means for transmitting said Y-representing signal, and means for receiving said Y-representing signal and for supplying it to said image-reproducing apparatus to control variations in the brightness of the reproduced image.

16. The system of claim 15, comprising in addition means for subtracting said Y-representing signal from said P- and Q-representing signals, at said transmitter.

17. The system of claim 15, in which said first and second periodic signals are substantially in phase quadrature.

18. The system of claim 15, in which the sum of A and B, and the sum of C and D, are each substantially equal to unity.

19. The system of claim 15, in which A is substantially equal to $$\frac{1}{1-K}$$

B is substantially equal to $$\frac{-K}{1-K}$$

C is substantially equal to $$\frac{K}{K+1}$$

and D is substantially equal to $$\frac{1}{K+1}$$

where K is a constant having a value greater than zero and less than substantially one-half.

20. The system of claim 19, in which said constant K is substantially equal to 0.23.

21. A system for the translation of intelligence as to the chromaticity of light from image elements, said system comprising: a transmitter for generating and for transmitting signals representative of the P and Q values of said light, said P values being substantially equal to the sum of A times the standard X values of said light and B times the standard Z values of said light, where the ratio of B to A lies between zero and minus one-half, the variations produced in said transmitted signal in response to a unit change in said P values of said image elements being equal to a predetermined proportionality constant $K_P$; said Q values being substantially equal to the sum of C times said standard X values and D times said standard Z values, where the ratio of C to D is substantially equal to the negative of said ratio of B to A, said variations in said transmitted signal produced in response to a unit change in said Q values of said image elements equalling a proportionality constant $K_Q$, the ratio of $K_P$ to $K_Q$ defining a component ratio R differing from unity; a receiver comprising an image-reproducing portion adapted to produce light of predetermined primary colors in controllable amounts; and means included in said receiver for receiving said transmitted signals, said last-named means comprising signal-amplitude modifying apparatus responsive to P- and Q-representing signals characterized by a component ratio R equal to unity, to effect reproduction of the chromaticity of said image elements, said signal-modifying apparatus also comprising additional means for further modifying said received P- and Q-representing signals to amplify said Q-representing signal by an amount which is R times greater than the amplification provided thereby for said P-representing signal, said component ratio R being substantially equal to the ratio of the maximum sensitivity of the average human eye for variations in only the P values of colors of a given brightness, to the maximum sensitivity of the average human eye for variations in substantially only the Q values of colors of said brightness.

22. The system of claim 21, in which said component ratio R is substantially equal to two.

23. Signal receiving means responsive to transmissions comprising a signal component related to variations in the P values of image elements by a proportionality constant $K_P$, and a signal component related to variations in the Q values of said image elements by a proportionality constant $K_Q$, said constant $K_P$ exceeding said constant $K_Q$ by a factor R, for reproducing the chromaticity of said image elements, said P values being substantially equal to the sum of A times the standard X values of said image elements and B times the standard Z values of said image elements, where the ratio of B to A lies between zero and minus one-half, said Q value being substantially equal to the sum of C times said standard X values of said elements and D times said standard Z values of said elements, where the ratio of C to D is substantially equal to the negative of said ratio of B to A, said receiving means comprising: image-reproducing apparatus including a plurality of sources of different primary colors of light of controllable intensity, said apparatus being controllable in response to signals representative of the values of said image elements with respect to said primary colors, to reproduce the chromaticity of said image elements; means for receiving said signals representative of said P and Q values of said image elements; a matrix circuit responsive to signals representative of said P and Q values of said image elements to derive therefrom output signals representative of said values of said elements with respect to said primary colors; and means for supplying said received signals to said matrix network and for supplying said output signals of said matrix network to said image reproducing apparatus to control the reproduction therein of the chromaticity of said image elements.

24. The system of claim 23, in which said matrix circuit comprises apparatus responsive to P- and Q-representing signals characterized by a component ratio R substantially equal to unity to produce output signals for effecting reproduction of said chromaticity of said image elements, and which also comprises additional means for further augmenting the amplitude of said Q-representing signal, relative to said P-representing signal, by a factor substantially equal to said component ratio R.

25. The system of claim 24, in which said factor R is substantially equal to the ratio of the maximum sensitivity of the average human eye for changes in only the P values of colors of any given brightness, to the maximum sensitivity of the average human eye for changes in only the Q values of colors of said brightness.

26. The system of claim 25, in which said ratio R is substantially equal to two.

References Cited in the file of this patent

UNITED STATES PATENTS

| | | |
|---|---|---|
| 2,492,926 | Valensi | Dec. 27, 1949 |
| 2,558,489 | Kalfaian | June 26, 1951 |
| 2,560,567 | Gunderson | July 17, 1951 |
| 2,590,350 | Roeper | Mar. 25, 1952 |